United States Patent
Check

(10) Patent No.: US 6,425,752 B1
(45) Date of Patent: Jul. 30, 2002

(54) BUBBLER TUBE WITH INTEGRAL INLET PIPE AND BIMETAL CORE FOR INJECTION MOLDING TOOLS AND METHOD OF MAKING THE BUBBLER TUBE

(76) Inventor: John M. Check, 6130 Single Tree La., Williamsburg, MI (US) 49690

( * ) Notice: Subject to any disclaimer, the term of this patent is extended or adjusted under 35 U.S.C. 154(b) by 0 days.

(21) Appl. No.: 09/526,626

(22) Filed: Mar. 16, 2000

Related U.S. Application Data

(60) Provisional application No. 60/125,497, filed on Mar. 22, 1999.

(51) Int. Cl.$^7$ .......................... B29C 33/04; B29C 49/64; B29C 45/73
(52) U.S. Cl. ................. 425/526; 425/533; 425/547; 425/552; 249/79; 249/80; 29/402.07
(58) Field of Search .............................. 249/79, 80, 81; 425/547, 526, 533, 552; 29/402.07

(56) References Cited

U.S. PATENT DOCUMENTS

| | | | |
|---|---|---|---|
| 4,020,137 A | * | 4/1977 | Lachner et al. ............. 425/533 |
| 5,498,150 A | * | 3/1996 | Check ........................ 425/547 |
| 6,077,067 A | * | 6/2000 | Gellert ........................ 425/552 |
| 6,079,972 A | * | 6/2000 | Gellert ........................ 425/552 |
| 6,168,740 B1 | * | 1/2001 | Gellert ........................ 425/548 |
| 6,176,700 B1 | * | 1/2001 | Gellert ........................ 425/548 |
| 6,276,922 B1 | * | 8/2001 | Huston et al. ............. 425/526 |

* cited by examiner

*Primary Examiner*—Robert Davis
(74) *Attorney, Agent, or Firm*—Reising, Ethington, Barnes, Kisselle, Learman & McCulloch, PC

(57) ABSTRACT

A mold assembly including moveable mold parts, one of which includes a plurality of hollow cavities. Each hollow cavity forms an outer wall of an elongated, generally annular portion of a molded part and the other mold part includes a corresponding plurality of core elements, which form an inner wall of the same portion of the molded part. Each core is disposed within a corresponding cavity to define a generally annular mold chamber portion for receiving molten material to be molded to form the shape of the portion of the molded part. Each core element includes a cooling apparatus and each cavity includes an outside cavity-cooling device. Each core element includes a first portion made of high strength material and a tip portion made of material having a greater heat diffusivity and heat transfer coefficient than said first portion.

12 Claims, 1 Drawing Sheet

BUBBLER TUBE WITH INTEGRAL INLET PIPE AND BIMETAL CORE FOR INJECTION MOLDING TOOLS AND METHOD OF MAKING THE BUBBLER TUBE

This is a utility application based on United States provisional application Serial No. 60/125,497 filed on Mar. 22, 1999.

TECHNICAL FIELD

This invention relates to molding apparatus and more particularly to molding apparatus having water-cooled core and cavity assemblies that cooperate to form hollow molded parts. The apparatus is an improvement on the molding apparatus shown in U.S. Pat. No. 5,498,150 issued to me on Mar. 12, 1996 and incorporated herein by reference.

BACKGROUND OF THE INVENTION

To decrease cycle time and to insure good molding of either metal casting or injection molded plastic parts, it is advantageous to provide coolant flow passages within a mold apparatus. When cooling fluid is passed through such passages during the molding process, it removes heat from the apparatus. Where a molding apparatus includes a mold cavity part that has a plurality of female cavities formed within it, and where those female cavities are configured to receive core parts that cooperate with the female cavities to form the surfaces of a molded part, apparatus for cooling has included a round cooling tube that is formed by the interior surface of the core part. An example of such cooling apparatus is set forth in U.S. Pat. No. 4,655,280.

One problem with such arrangements is that molded parts having an elongated configuration must be formed, in part, by a core that has a length to width ratio large enough to allow the core to deflect when impacted by material that is injected against the core under high pressure conditions. Since many materials are best shaped and densified under such high pressure conditions, one problem with prior art apparatus is how to provide a low cost, elongated core that will not deflect or warp under high temperature and high pressure operation.

Another problem with such molding apparatus is that the coolant flow is restricted to an annular surface in such a way as to limit the removal of heat from each of the mold cavities.

U.S. Pat. No. 5,498,150 issued to me on Mar. 12, 1996 addresses these problems by disclosing a mold assembly having a mold part that forms the outer wall of a molded part. The mold part has a plurality of elongated cavities within it. A fluid cooled core is inserted within each of the elongated cavities before injecting material into the mold assembly. Each fluid cooled core has an outer surface that forms an inner wall of a tubular portion of the molded part. Each fluid cooled core includes a plurality of circumferentially spaced, longitudinal ribs or fins that extend integrally and radially inward from around an inner circumferential surface of the core. The ribs reinforce each fluid cooled core radially inwardly of their respective elongated cavities and along the length of each fluid cooled core. This construction controls core deflection that results from high-pressure injection of a material to be molded. A separate fluid inlet pipe is disposed coaxially within each core and is radially spaced from the inner circumferential surface of each core. An outer end of each fluid inlet pipe is adapted to be connected to a source of coolant and an inner end is in communication with a plurality of circumferentially spaced passages defined by the ribs within each core. Each of these passages returns the flow of cooling fluid to an elongated annular passage that extends along the length of the core between the fluid inlet pipe and the inner surface. Radially inner edges of the ribs are configured to slidably receive an inner length of the fluid inlet pipe during core assembly.

After assembly, each fluid inlet pipe lies in contact with or in close proximity to the rib inner edges. While this design is more resistant to warping and deformation during injection than prior art assemblies, the fluid inlet pipe still has some freedom to rotate, flex, warp and otherwise deform under the force of pressurized injections of molten material during molding. In addition, while the temperature of the core can be controlled using the fluid cooling system, the cavity portion of the mold cannot.

In my copending U.S. patent. application Ser. No. 09/153,956 filed Sep. 16, 1998, incorporated herein by reference a further improvement is provided that defines a fluid cooled core that is stronger, more rigid and therefore more resistant to deflection and warping under high temperature and high-pressure operation and a configuration that is able to cool both inner and outer walls of a tubular portion of a molded part. A mold assembly is provided that includes spaced, moveable mold parts, one mold part including a hollow cavity having a cavity inner surface configured to form an outer wall of an elongated, generally annular molded part and the other mold part including a corresponding core element having a core outer surface configured to form an inner wall of the molded part. The core element is at least partially disposed within the cavity and the core outer surface is spaced from the cavity inner surface defining a generally annular mold chamber for receiving molten material to be molded to the shape of the molded part. The core element has an open end and a closed end that defines a hemispherical portion of the core outer surface. The core element further includes a generally tubular core inner surface and a plurality of circumferentially spaced longitudinal ribs that integrally extend radially inward from the core inner surface. The ribs define a plurality of elongated coolant passages. A fluid inlet pipe is coaxially disposed within the core element. The fluid inlet pipe has a pipe outer surface spaced from the core inner surface, one end of the fluid inlet pipe configured to connect to a source of coolant and a second end of the pipe being in fluid communication with the plurality of coolant passages. In this arrangement greater strength and the heat transfer is obtained since the ribs are integral to both the fluid inlet and the core element to reinforce the core element radially inwardly of the mold chamber and along the length of the core element against core deflection that results from high pressure injection of a material to be molded. This design is more resistant to warping and deformation during injection than prior art designs.

While suitable for their intended purpose such arrangements have used stainless steel rather than copper or other softer materials. Copper core material, while having the ability to improve heat transfer from the core to the coolant fluid can be damaged by impacts thereon during the molding process.

INVENTION SUMMARY

In accordance with this invention a mold assembly is provided that includes spaced, moveable mold parts, one mold part including a hollow cavity having a cavity inner surface configured to form an outer wall of an elongated, generally annular molded part and the other mold part including a corresponding core element having a core outer surface configured to form an inner wall of the molded part. The core element is at least partially disposed within the cavity and the core outer surface is spaced from the cavity inner surface defining a generally annular mold chamber for receiving molten material to be molded to the shape of the molded part. The core element has an open end and a closed end that defines an end portion of the core outer surface. The core element further includes a first portion of a high strength material defining a generally tubular core inner surface; a plurality of circumferentially spaced longitudinal ribs can be provided that extend radially inward from the core inner surface through part of the length of the core element. The ribs define a plurality of elongated coolant passages that receive return coolant flow from an annular space formed between a second reduced diameter hollow tip portion of the core element. A fluid inlet pipe is coaxially disposed within the core element. The fluid inlet pipe has a pipe outer surface spaced from the core inner surface, one end of the fluid inlet pipe connects to a source of coolant and a second end of the pipe is in fluid communication with the plurality of coolant passages. Such a construction is improved by providing a bimetal core element having a first portion formed of relatively high strength lower heat transfer material such as stainless steel and having a second portion defining a core element tip formed of a high strength alloy material to resist impact damage while providing increased thermal diffusivity and increased thermal conductivity. A fluid inlet pipe is assembled axially within the bimetal core element. Furthermore, the first and second portions can be connected by suitable bonding techniques so that the pre-existing core elements of the types shown in copending United States Patent Applications can be upgraded.

The method comprises the steps of cutting the end of a core; providing a hollow tip of higher thermal conductivity than the cut end; placing the hollow tip over the cut end and thereafter bonding an end of the hollow tip to the cut end of the core.

DESCRIPTION OF THE DRAWINGS

Other advantages of the present invention will be readily appreciated, as the same becomes better understood by reference to the following detailed description when considered in connection with the accompanying drawings wherein.

PREFERRED EMBODIMENT DESCRIPTION

Figure 1:
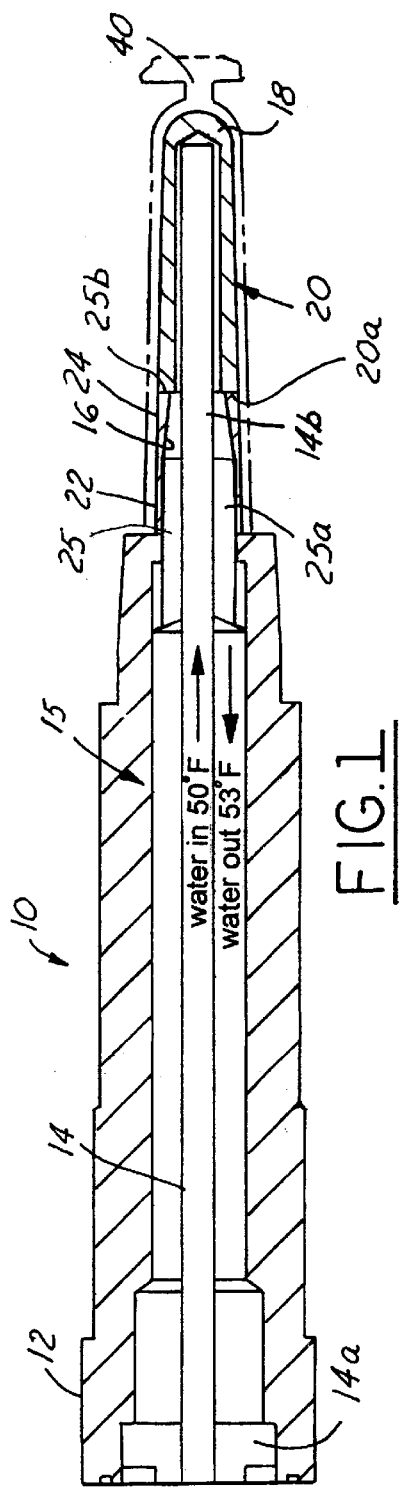
FIG. 1 is a fragmentary sectional view of an inlet pipe and core constructed according to the invention.

An integral bubbler type water-cooled core element or core assembly 10 is shown in FIG. 1 as having a core support portion 12, a bubbler tube 14 and a core 15. The bubbler tube 14 has an inlet segment 14a and an extension segment 14b. The core 15 has a cylindrical outer surface 16 and a closed end 18 of the type shown in the '150 patent. The core 15 further has a small diameter tip portion 20 and a large diameter portion 22 with a tapered portion 24 between the large and small diameter portions that in the present embodiment are thus configured for defining the inside surface of an injection molded member. that defines a hollow preform suitable for blowing molding a bottle or other blow molded article. The shape of the outer surface of the core 15 thus depends on the shape of the part to be injection molded about the core. In some cases the portions 20, 22 can be almost the same diameter with a small taper therebetween when, for example, the part being formed as a preform for hollow cylinder disposable syringes. In the illustrated embodiment, small diameter portion 20 is formed of a high heat transfer material such as Copper, Aluminum, Tungsten Carbide Cobalt, Silicon Carbide, Beryllium Cooper but is preferably formed of a high impact resistance material that does not have materials therein that are incompatible with applications for molding medical parts or the like. One example of such material is an alloy of nickel copper and tungsten. Other suitable materials include AMPCO97; AMPCO940; tungsten carbide copper; tungsten carbide cobalt and like materials having thermal conductivity in the range of 100–250 W/m/degree K.

The large diameter portion 22 and tapered portion 24 form an end portion 25 with ribs 25a like those in the '150 patent. This part of the core 25 is formed of durable material having less heat transfer than the tip portion 20, e.g., steel, aluminum alloy or other suitable material.

Figure 2:
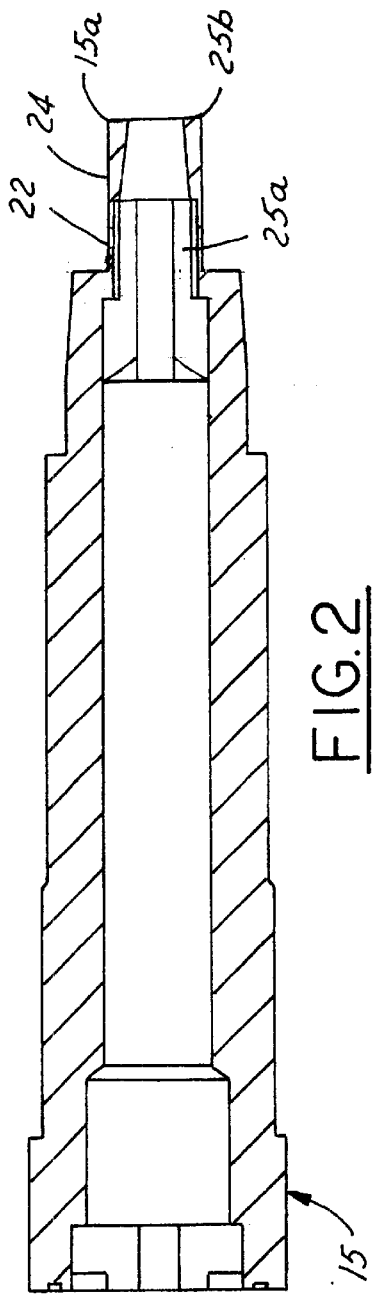
FIG. 2 is a view of a cut core.
Figure 3:
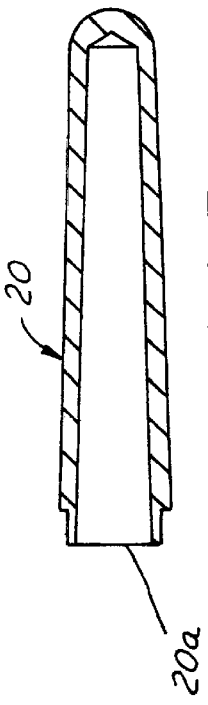
FIG. 3 is a view of a hollow tip used in the method of the present invention.

The small diameter tip portion 20 of the core 15 has its end 20a diffusion bonded to an end surface 25b of the end portion 25. A uniform annular space is provided between the tip portion and the inlet tube extension 14b on the end of the bubbler tube 14. As shown in FIG. 2 and 3 the method of the present invention includes providing a core 15 of the type shown in U.S. Pat. No. 5,498,150 or U.S. Ser. No. 09/153, 956. The core 15 is cut at one end thereof as to form an end surface 15a thereon as shown in FIG. 2. A performed tip 20 is provided having a higher heat transfer coefficient than the material of core 15. An open end 20a of tip 20 is joined to the surface 15a. The joined parts are then bonded by diffusivity bonding. Other suitable connections include, but are not limited to, adhesive connections; friction weld; laser welds; electron beam welds; braze connections and resistance welds. Following such connection, a bubbler tube is installed to form a ready to use upgraded assembly. The resultant assembly whether formed as an upgrade or as an original bimetal core, allows the core body to have the robustness of a steel body for toughness and hardness and the tip of the core to have a high thermal conductivity for maximum heat extraction from a preform at the hottest part of a plastic preform that is formed about the core element during known two step molding operations.

The result is a bimetal construction described above wherein the mold cavity is more effectively cooled at the inlet flow passage of molten material into the mold cavity (shown in outline in FIG. 1 at 40) than if it were to rely solely on cooling provided by a water cooled core assembly of the type shown in the prior art.

I claim:

1. In a mold assembly including spaced, moveable mold parts, one mold part including a hollow cavity having a cavity inner surface configured to form an outer wall of an elongated, generally annular molded part and the other mold part including a corresponding core element having a core outer surface configured to form an inner wall of the molded part, the core element being at least partially disposed within the cavity and the core outer surface spaced from the cavity inner surface defining a generally annular mold chamber for receiving molten material to be molded to the shape of the molded part, the core element having a first portion and a second portion that defines an end portion of the core outer surface; the core element further including a generally tubular core inner surface and a fluid inlet pipe coaxially disposed within the core element, the fluid inlet pipe having a pipe outer surface spaced from the core inner surface, one end of the fluid inlet pipe configured to connect to a source of coolant and a second end of the pipe being in fluid communication with the plurality of coolant passages; the improvement comprising: said first portion of said core element made from high strength material and configured as a part of the core outer surface and said second portion of said core element formed of a high strength alloy material resistant to impact damage and having greater thermal diffusivity and thermal conductivity than said first portion, the high strength material at said open end.

2. In the mold assembly of claim 1, said second portion configured as a hollow tip of higher thermal conductivity than the first portion.

3. In the mold assembly of claim 2, said hollow tip enclosing said second end of said fluid inlet pipe.

4. In the mold assembly of claim 2, said hollow tip being diffusion bonded to said first portion.

5. In the mold assembly of claim 3, said hollow tip being diffusion bonded to said first portion.

6. In the mold assembly of claim 1, said first portion formed of stainless steel and said second portion formed of nickel copper tungsten material.

7. In the mold assembly of claim 2, said first portion formed of stainless steel and said second portion formed of nickel copper tungsten material.

8. In the mold assembly of claim 3, said first portion formed of stainless steel and said second portion formed of nickel copper tungsten material.

9. In the mold assembly of claim 4, said first portion formed of stainless steel and said second portion formed of nickel copper tungsten material.

10. In the mold assembly of claim 5, said first portion formed of stainless steel and said second portion formed of nickel copper tungsten material.

11. In the mold assembly of claim 1, said second portion having a thermal conductivity in the range of 100–250 W/m/degK.

12. A method for improving the performance of a mold assembly including spaced, moveable mold parts, one mold part including a hollow cavity having a cavity inner surface configured to form an outer wall of an elongated, generally annular molded part and the other mold part including a corresponding core element having a core outer surface configured to form an inner wall of the molded part, the core element being at least partially disposed within the cavity and the core outer surface spaced from the cavity inner surface defining a generally annular mold chamber for receiving molten material to be molded to the shape of the molded part, the core element having a .first portion and a second portion that defines an end portion of the core outer surface; the core element further including a generally tubular core inner surface and a fluid inlet pipe coaxially disposed within the core element, the fluid inlet pipe having a pipe outer surface spaced from the core inner surface, one end of the fluid inlet pipe configured to connect to a source of coolant and a second end of the pipe being in fluid communication with the plurality of coolant passages, the method including the steps of cutting the end of the first portion of the core element; providing a hollow tip of higher thermal conductivity than the first portion and placing it over the heat pipe extension; and bonding an end of the hollow tip to the cutoff end of the first portion.

* * * * *